United States Patent
Martin et al.

[15] 3,671,069
[45] June 20, 1972

[54] CARGO CONTAINER LIFTING AND SPACING APPARATUS

[72] Inventors: John Frank Martin; Charles Dean Ramsden, Alameda, both of Calif.

[73] Assignee: Fruehauf Corporation, Detroit, Mich.

[22] Filed: July 15, 1970

[21] Appl. No.: 54,960

[52] U.S. Cl. ........................... 294/81 SF, 212/14, 212/128, 294/67 R
[51] Int. Cl. .............................................. B66c 1/00
[58] Field of Search ................... 212/125, 128, 14; 294/67 R, 294/67 A, 67 DA, 81 R, 81 SF

[56] References Cited

UNITED STATES PATENTS

| | | | |
|---|---|---|---|
| 3,536,351 | 10/1970 | Zweifel et al. | 294/81 |
| 2,063,915 | 12/1936 | Fitch | 212/14 |
| 1,433,993 | 10/1922 | Fitch | 294/67 |
| 3,116,586 | 1/1964 | Ingham | 212/125 |

*Primary Examiner*—Richard E. Aegerter
*Assistant Examiner*—J. Kenneth Silverman
*Attorney*—Townsend and Townsend

[57] ABSTRACT

Cargo container loading apparatus in which the containers are carried on a pair of spreaders, each suspended from a separate platform mounted on a trolley. The spacing between the containers is adjustable, independently of the spreaders, by means of motor operated screws which move the platforms toward or away from each other on the trolley.

3 Claims, 3 Drawing Figures

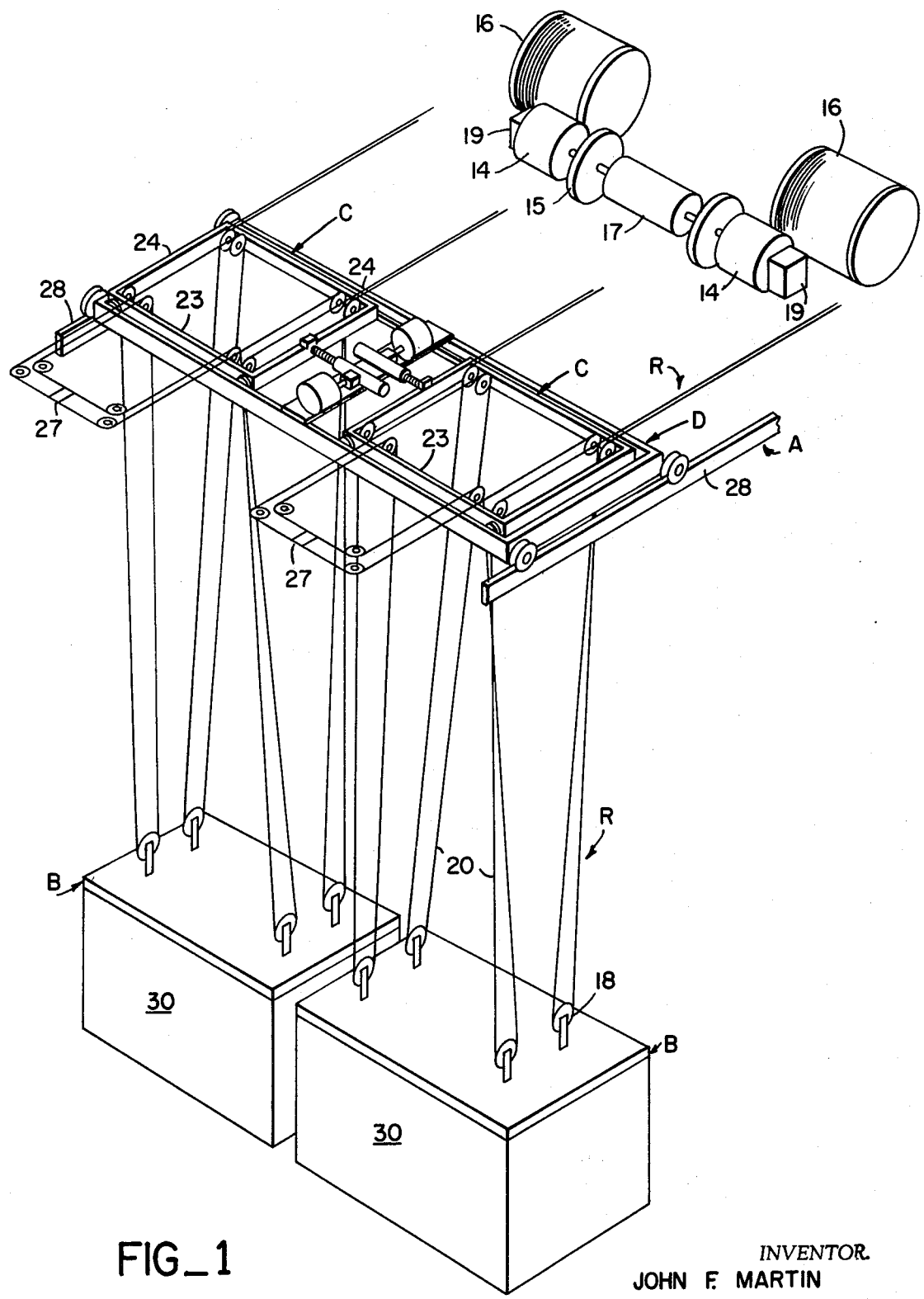
FIG_1
INVENTOR.
JOHN F. MARTIN
C. D. RAMSDEN
Townsend and Townsend
ATTORNEYS

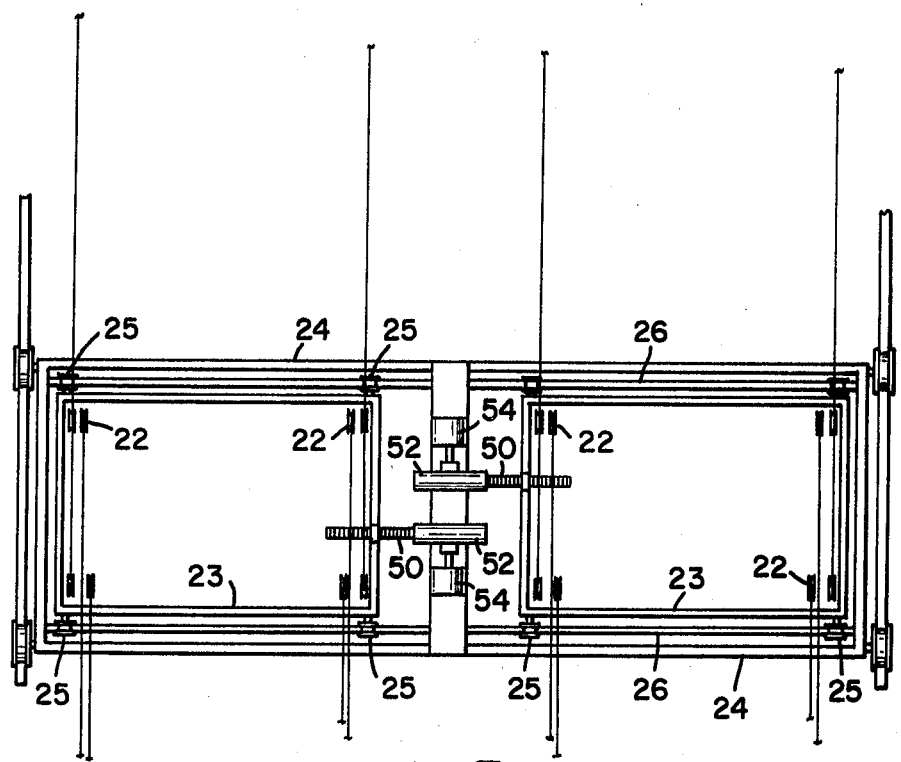
FIG_3
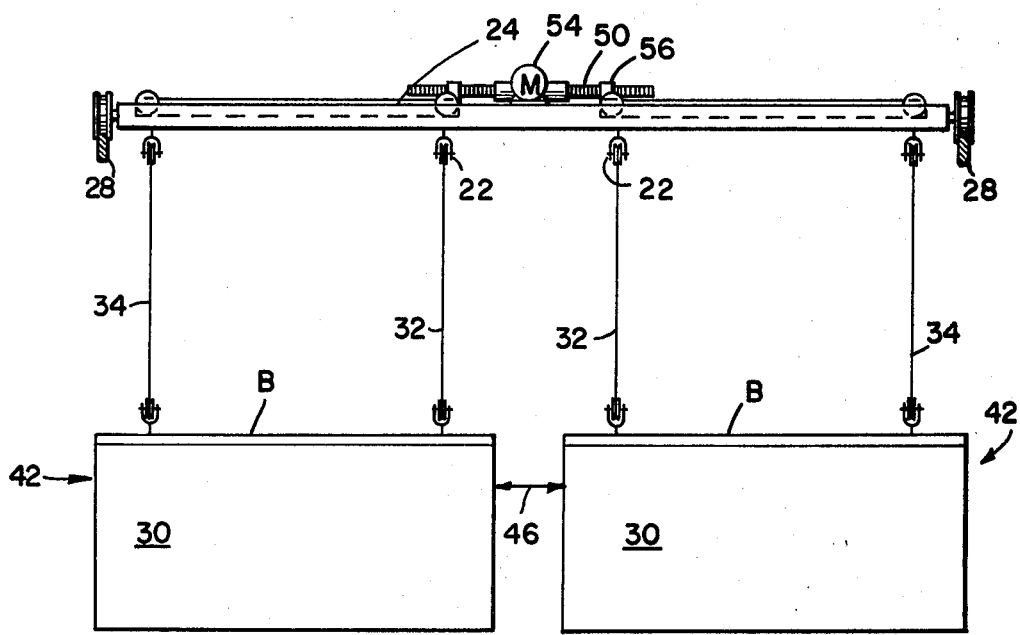
FIG_2
INVENTOR.
JOHN F. MARTIN
C. D. RAMSDEN
Townsend and Townsend
ATTORNEYS

CARGO CONTAINER LIFTING AND SPACING APPARATUS

This invention relates to cargo container handling apparatus and, more particularly, to an improved apparatus for maintaining the separation between containers being loaded and unloaded.

This invention is related to the cargo container lifting and spacing apparatus described and claimed in a copending application entitled "Apparatus for Simultaneously Lifting and Spacing Cargo Containers," filed Nov. 13, 1967, Ser. No. 682,462 now U.S. Pat. No. 3,536,351 issued Oct. 27, 2970 and assigned to the same assignee as the present invention. In the earlier filed application there was described and claimed cargo container handling apparatus comprising a pair of spreaders suspended from cables carried on pulleys on a trolley moved along tracks mounted on a loading crane. In the earlier application the suspension cables were inclined from the vertical in order to create a gravitational bias so that the normal tendency of loaded containers would be to move toward each other. There was provided in this apparatus a pair of spacer bars for maintaining the separation between the spreaders and the containers engaged by the spreaders so that the containers could be more easily and quickly lowered into the cell systems on container ships. The spacer bar mechanisms included mechanism for releasing the bars when the containers were in place in the cell support structure and it was necessary to clear the tie bars between the vertical cell support members.

The apparatus described and claimed in the earlier application was required to have provision for automatic release of the solid spacing member in either direction in order to preclude damage to the member or to the cell structures in the event that the remote controlled release mechanism did not function in descent or in the event that the spacing member was in place when the containers were to be lifted from the cell structure. The present invention is designed to eliminate the requirement for remote controlled electrical or mechanical devices necessary to maintain the separation of the containers either upon loading or unloading. The present invention, which comprises means for moving a pair of separate platforms each suspending a separate container holding spreader, permits completely independent movement of the spreaders in all loading and unloading operations. The present invention eliminates completely the various mechanical and/or electrical devices which were required both to maintain the containers separated and to retract the spacer bars when the containers entered into the cell guides.

The apparatus of the present invention comprises substantially similar components to those which have been previously described in the copending application referred to previously and includes certain unique features which are the subject of the present application. The container spreaders are suspended from the pair of platforms mounted on a trolley. The pulleys and sheaves from which the spreaders are suspended are uniformly spaced so that the cables, chains or ropes are substantially vertical. In the preferred embodiment of the present invention there is mounted on the trolley between the two platforms from which the spreaders are suspended, motorized screw jacks for moving the platforms laterally along the trolley to vary the spacing between the spreaders suspended below. The spacing between the spreaders is varied solely by means of the powered screw jacks so that there is no device or apparatus between the containers to interfere with the entry of the containers and spreaders into the cell guide structures. The motorized screw jacks described below are not the only kind of spacing apparatus which might be utilized for moving the platforms laterally along the trolley. Other mechanical, electrical, or hydraulic power means might be used, such as hydraulic cylinders, rack and pinion drives, chains, and sprockets or other related power mechanisms.

IN THE DRAWINGS

FIG. 1 is a schematic perspective view of cargo container handling apparatus of the present invention;

FIG. 2 is a front elevational view of two containers suspended from apparatus of the present invention and showing the relationship of the various component parts; and FIG. 3 is a plan view of the trolley and the platforms mounted thereon.

Referring now more particularly to the drawings in which the same reference numerals apply to identical parts in each of the several views, in FIG. 1 the lifting apparatus A supports a pair of spreaders B each of which is supported by one of a pair of platforms C carried on a trolley D. Lifting apparatus A comprises paired motors 14 which drive pinions 15 meshing with gears connecting to the rotatable drums 16. The respective pinions 15 are intercoupled by a clutch 17 which restricts the motors 14 and drums 16 to simultaneous and equal rotation to permit simultaneous raising and lowering of the spreaders B by means of cables R wound on the drums and connected to the spreaders.

Each spreader B is provided with four sheaves 18 through which the cable R is threaded. The cables include the vertical tension portions 20 which pass through the sheaves 18 and thence through the trolley pulleys 22 carried on platforms 23 mounted on the trolley assembly 24. The cables are reeved around one end of the lift apparatus frame (not separately shown) by means of frame tie-downs 27, and at the opposite end are attached two drums 16. Trolley 24 rides on frame rails 28 which are supported overhead by the crane framework which forms no part of the present invention and is therefore not shown. As is clear from the drawing when drums 16 are rotated the spreaders B are moved vertically the taking up or letting out of the cables 20. The horizontal position of the spreaders is varied along the length of the rails 28 by moving the trolley 24 along the rails.

The lifting apparatus A simultaneously raises and lowers the paired spreaders B when clutch 17 intercouples the pinions 15. Such simultaneous vertical movement is usually desirable in order to lift or load pairs of containers in the minimum possible time. However, it is possible to utilize either of the spreaders B independently of the other should such operation be necessary or desirable. This independent operation is achieved by disengaging clutch 17 and therefore uncoupling the pinions 15. Thereafter one of the spreaders B is raised so that it will not obstruct movement of the other spreader. This is done by controlling its separate driving motor 14 and locking the spreader in position by utilizing the brake 19 attached to the motor. The remaining spreader may then be operated in the conventional manner as if it were the sole spreader available for use.

The application thus far has described the operation of the lifting and moving apparatus used to lower the spreaders B onto a stack of cargo or cargo containers 30. The spreaders are provided with gripping devices which engage mating parts on the containers. Thus, when the motors 14 are actuated, drums 16 rotate and wind up the cables and raise the spreaders and the containers engaged by them. As might be expected, rotation of the drum 16 will raise of lower the spreaders and their engaged containers depending upon the direction of rotation, and movement of the trolley 24 along the rail 28 will change the horizontal position of the spreaders and their loads.

The operation of the spreaders and their typical construction forms no part of the present invention and will not be described in detail here. Reference is made to the specification of the previously mentioned copending application for a detailed description of the spreaders, their construction and operation.

The spacing 46 between the containers is controlled by movement of the platforms 23 toward and away from each other. The platforms 23 are mounted for fore and aft movement on the trolley frame 24. In the embodiment illustrated herein, the platforms are mounted on wheels 25 which roll along tracks 26 which extend along the length of the frame of the trolley 24. Movement of the platforms in the fore and aft direction along the tracks 26 is accomplished by means of screws 50 which are rotated by gear reduction units 52 powered by motors 54. The screws 50 pass through a threaded sleeve 56 mounted on the frame 23 of the platform. Thus when the motors are actuated the screws 50 will rotate and, depending upon the direction of rotation, will cause the platforms 23 to move to and fro within the trolley frame. Movement of the platforms along the trolley frame will change the spacing 46 between the containers 30 suspended from the platforms.

The operation of the apparatus of the present invention is simple and straightforward. The trolley 24 is moved into position along the tracks 28 so that the spreaders B are placed in position generally aligned with the containers to be moved. The trolley 24 is moved so that the spreaders are aligned along the longitudinal axis of the trolley and the motors 54 actuated to move the platforms 23 and the spreaders suspended therefrom in a fore and aft direction in order to match the spacing 46 between the containers. A single motor may be used in order to assure simultaneous movement of the two platforms. It is possible, utilizing the present invention, to lift containers having a spacing 46 different from the spacing configuration of the cell guides in the typical container ship and change the spacing to conform to that of the ship prior to lowering the containers into the ship cell guides. Because there is no connection whatsoever between the spreaders B the individual containers 30 may enter the cell guides without any fear of a mating device or a tie between the spreaders catching as the containers are lowered into the ship thus potentially damaging either the containers or the cell guides or both.

Because the power unit for moving the platforms 23 along the trolley 24 are mounted on the trolley structure itself there is no need for connections: electrical, hydraulic or otherwise between the spreaders and the balance of the lifting mechanism. Thus, there are no mechanical or electrical devices associated with the spreader units which might fail during loading or unloading operations and cause damage to the cargo, to the ship or to the lifting apparatus and thus there is nothing to delay the speedy and efficient loading or unloading of the ship.

While one embodiment of the invention has been shown and described, it will be obvious that other adaptations and modifications can be made without departing from the true spirit and scope of the invention.

We claim:

1. Apparatus for simultaneous transport of a plurality of cargo containers comprising first and second spreaders for engaging first and second containers, moving means for simultaneously moving said spreaders between a first location and a second location, first and second moveable platform means mounted on said moving means, said first spreader suspended from said first platform means and said second spreader suspended from said second platform means, and means for moving said platforms along said moving means toward and away from each other to vary the spacing between said spreaders.

2. Apparatus according to claim 1 wherein said moving means comprises an elongate trolley moveable along parallel tracks adjacent the ends of the trolley, said first and second platform means mounted on said trolley for movement along the longitudinal axis of the trolley.

3. In a twin lift spreader system wherein a plurality of depending cargo containers is transferred between a first disposition and a second disposition and the spacing between said cargo containers is changed during said transfer, said system including a pair of spreaders each having means for attachment to at least one of said depending cargo containers; each of said spreaders depending from a plurality of linear supports and supported in substantially the same horizontal plane; means for transporting said spreaders attached to the upper end of said linear supports, said means for transporting movable between positions overlying said first and second dispositions and including means for simultaneously raising and lowering said linear supports; the improvement comprising: movable spacing means for changing the spatial relationship of the point from which at least one of said linear supports depends to support one spreader relative to the point from which at least one of said linear supports depends to support said other spreader, said spacing means mounted on said transporting means, and power means mounted between said spacing means and said transporting means for moving said spacing means to vary spacing between said points from which said linear supports depend whereby the space between the spreader and said depending cargo containers can be varied.

* * * * *